(12) United States Patent
Hsiao et al.

(10) Patent No.: US 8,085,497 B2
(45) Date of Patent: Dec. 27, 2011

(54) METHOD OF MULTI-ANGLED BUMP PROCESSING FOR MAGNETIC POLE FABRICATION AND SYSTEMS THEREOF

(75) Inventors: Wen-Chien David Hsiao, San Jose, CA (US); Vladimir Nikitin, Campbell, CA (US); Aron Pentek, San Jose, CA (US); Sue Siyang Zhang, Saratoga, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 461 days.

(21) Appl. No.: 12/341,834

(22) Filed: Dec. 22, 2008

(65) Prior Publication Data

US 2010/0157474 A1    Jun. 24, 2010

(51) Int. Cl.
   *G11B 5/127* (2006.01)
(52) U.S. Cl. .............. 360/125.02; 360/125.03
(58) Field of Classification Search ............. 360/125.02, 360/125.03
   See application file for complete search history.

(56) References Cited

U.S. PATENT DOCUMENTS

| | | | |
|---|---|---|---|
| 5,804,085 A | 9/1998 | Wu et al. | 216/22 |
| 6,010,745 A | 1/2000 | Sato et al. | 427/128 |
| 6,369,984 B1 | 4/2002 | Sato | 360/126 |
| 6,393,692 B1 | 5/2002 | Ju et al. | 29/603.14 |
| 6,638,596 B1 | 10/2003 | Gotoh et al. | 428/141 |
| 7,012,789 B2 | 3/2006 | Ju et al. | 360/317 |
| 7,343,666 B2 | 3/2008 | Lee et al. | 29/603.16 |
| 7,343,668 B2 | 3/2008 | Kobayashi | 29/603.16 |
| 2002/0181162 A1 | 12/2002 | Chen et al. | 360/317 |
| 2006/0245114 A1 | 11/2006 | Guan et al. | 360/319 |
| 2007/0067982 A1* | 3/2007 | Kobayashi | 29/603.15 |
| 2007/0115584 A1 | 5/2007 | Balamane et al. | 360/126 |
| 2007/0245545 A1 | 10/2007 | Pentek et al. | 29/603.13 |

* cited by examiner

Primary Examiner — Ly D Pham
(74) Attorney, Agent, or Firm — Zilka-Kotab, PC

(57) ABSTRACT

A system according to one embodiment includes a magnetic pole; a bump structure above the pole, the bump structure having a first surface oriented at a first angle between 1° and 89° from a plane of deposition of the pole, and a second surface oriented at a second angle between 1° and 89° from the plane of deposition of the pole, wherein the second angle is greater than the first angle; and a shield above the bump structure. A method according to one embodiment includes forming a bump layer above a magnetic pole; removing a portion of the bump layer for forming a step therein; and milling the bump layer for defining thereon a first surface oriented at a first angle between 1° and 89° from a plane of deposition of the bump layer, and a second surface oriented at a second angle between 1° and 89° from the plane of deposition of the bump layer, wherein the second angle is greater than the first angle.

18 Claims, 6 Drawing Sheets

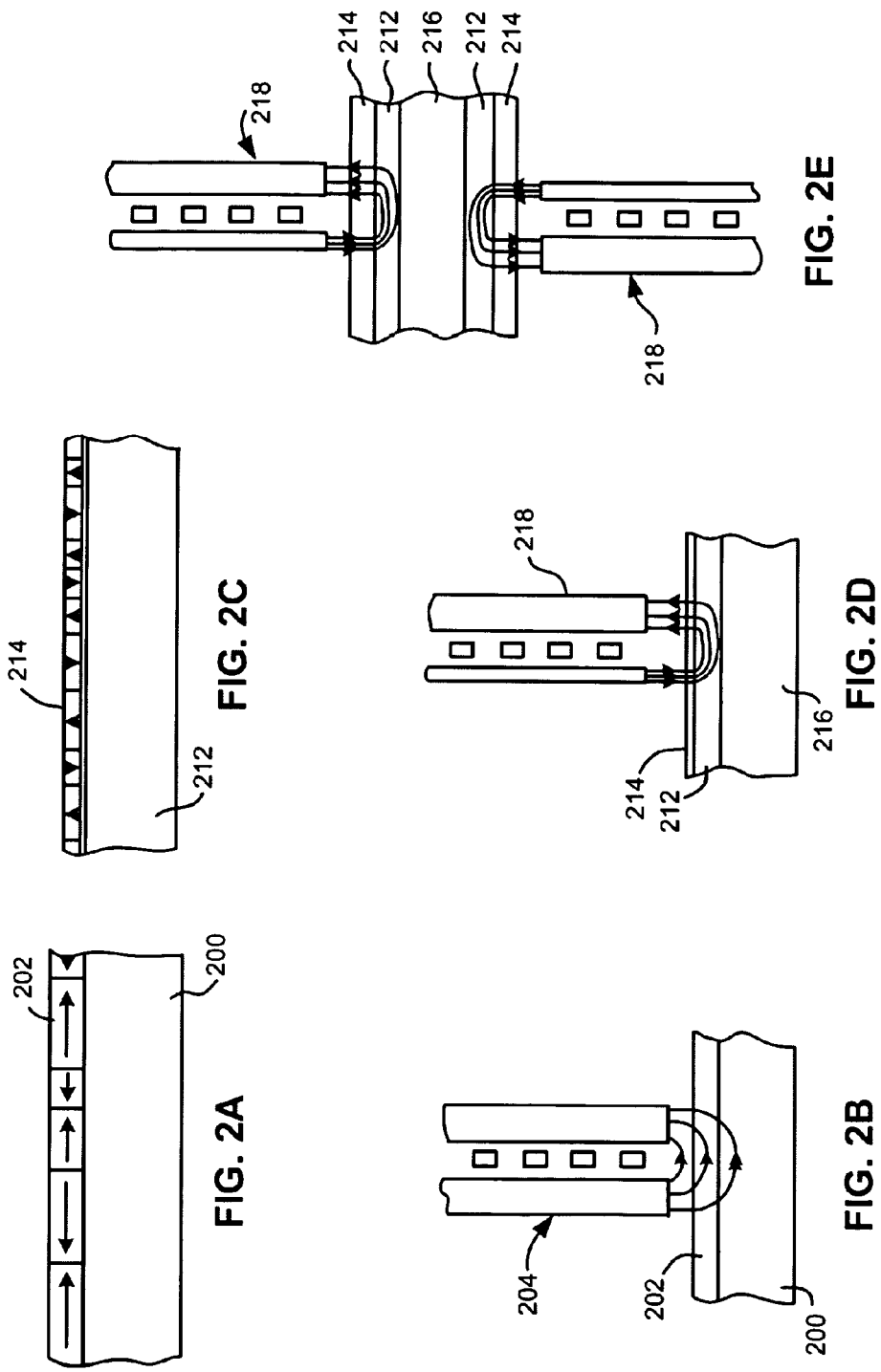

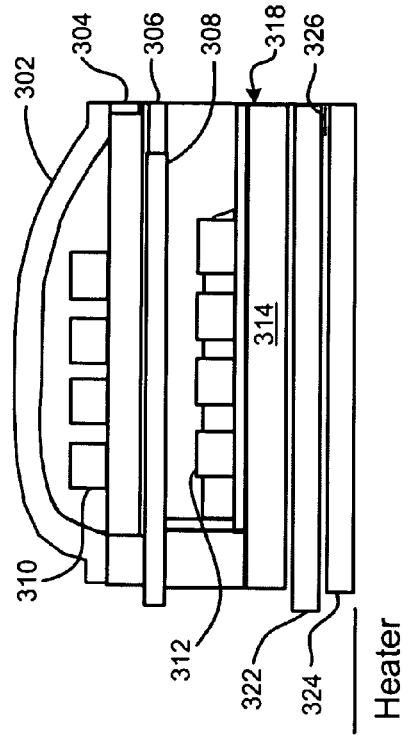
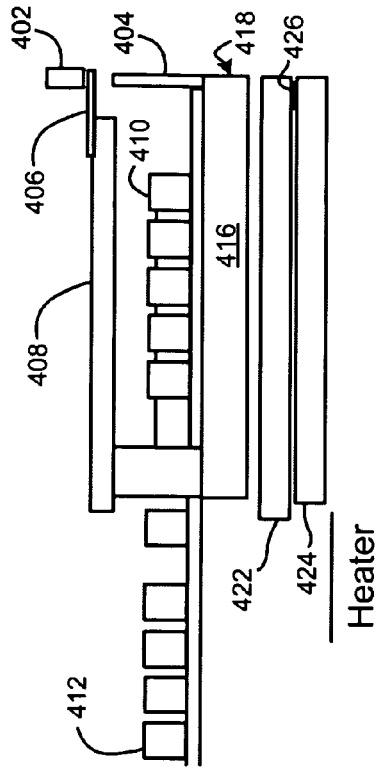
FIG. 3B
FIG. 4B
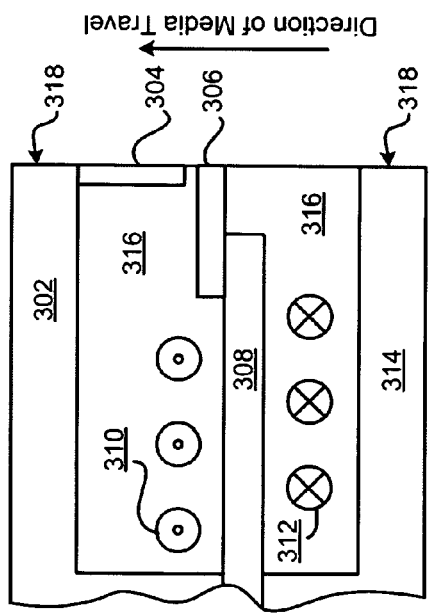
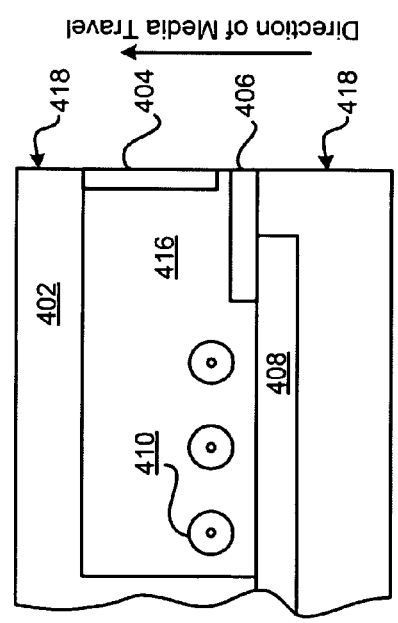
FIG. 3A
FIG. 4A

METHOD OF MULTI-ANGLED BUMP PROCESSING FOR MAGNETIC POLE FABRICATION AND SYSTEMS THEREOF

FIELD OF THE INVENTION

The present invention relates to data storage systems, and more particularly, this invention relates to magnetic heads and bump structures on magnetic poles.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

Conventional techniques used in the manufacture of magnetic poles and supporting structures sometimes utilize a bump process where a well defined slanted bump is included above the magnetic pole. However, the placement of this well defined slanted bump is generally quite sensitive. Therefore, it would be advantageous to have a technique which includes bump processing where the slanted bump placement is less sensitive than conventional techniques, thus allowing the creation of systems through more efficient manufacturing.

SUMMARY OF THE INVENTION

A system according to one embodiment includes a magnetic pole; a bump structure above the pole, the bump structure having a first surface oriented at a first angle between 1° and 89° from a plane of deposition of the pole, and a second surface oriented at a second angle between 1° and 89° from the plane of deposition of the pole, wherein the second angle is greater than the first angle; and a shield above the bump structure.

A method according to one embodiment includes forming a bump layer above a magnetic pole; removing a portion of the bump layer for forming a step therein; and milling the bump layer for defining thereon a first surface oriented at a first angle between 1° and 89° from a plane of deposition of the bump layer, and a second surface oriented at a second angle between 1° and 89° from the plane of deposition of the bump layer, wherein the second angle is greater than the first angle.

A method in yet another embodiment includes forming a first layer of nonmagnetic material above a magnetic pole; removing a portion of the first layer; forming a second layer of nonmagnetic material along side and above a remaining portion of the first layer, the second layer thereby forming a step; and milling the second layer and first layer for defining a first surface oriented at a first angle between 1° and 89° from a plane of deposition of the first layer, and a second surface oriented at a second angle between 1° and 89° from the plane of deposition of the first layer, wherein the second angle is greater than the first angle.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 2A is a schematic representation in section of a recording medium utilizing a longitudinal recording format.

FIG. 2B is a schematic representation of a conventional magnetic recording head and recording medium combination for longitudinal recording as in FIG. 2A.

FIG. 2C is a magnetic recording medium utilizing a perpendicular recording format.

FIG. 2D is a schematic representation of a recording head and recording medium combination for perpendicular recording on one side.

FIG. 2E is a schematic representation of a recording apparatus adapted for recording separately on both sides of the medium.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system comprises a magnetic pole; a bump structure above the pole, the bump structure having a first surface oriented at a first angle between 1° and 89° from a plane of deposition of the pole, and a second surface oriented at a second angle between 1° and 89° from the plane of deposition of the pole, wherein the second angle is greater than the first angle; and a shield above the bump structure.

In another general embodiment, a method comprises forming a bump layer above a magnetic pole; removing a portion of the bump layer for forming a step therein; and milling the bump layer for defining thereon a first surface oriented at a first angle between 1° and 89° from a plane of deposition of the bump layer, and a second surface oriented at a second angle between 1° and 89° from the plane of deposition of the bump layer, wherein the second angle is greater than the first angle.

In yet another general embodiment, a method comprises forming a first layer of nonmagnetic material above a magnetic pole; removing a portion of the first layer; forming a second layer of nonmagnetic material alongside and above a remaining portion of the first layer, the second layer thereby forming a step; and milling the second layer and first layer for defining a first surface oriented at a first angle between 1° and 89° from a plane of deposition of the first layer, and a second surface oriented at a second angle between 1° and 89° from the plane of deposition of the first layer, wherein the second angle is greater than the first angle.

Figure 1:
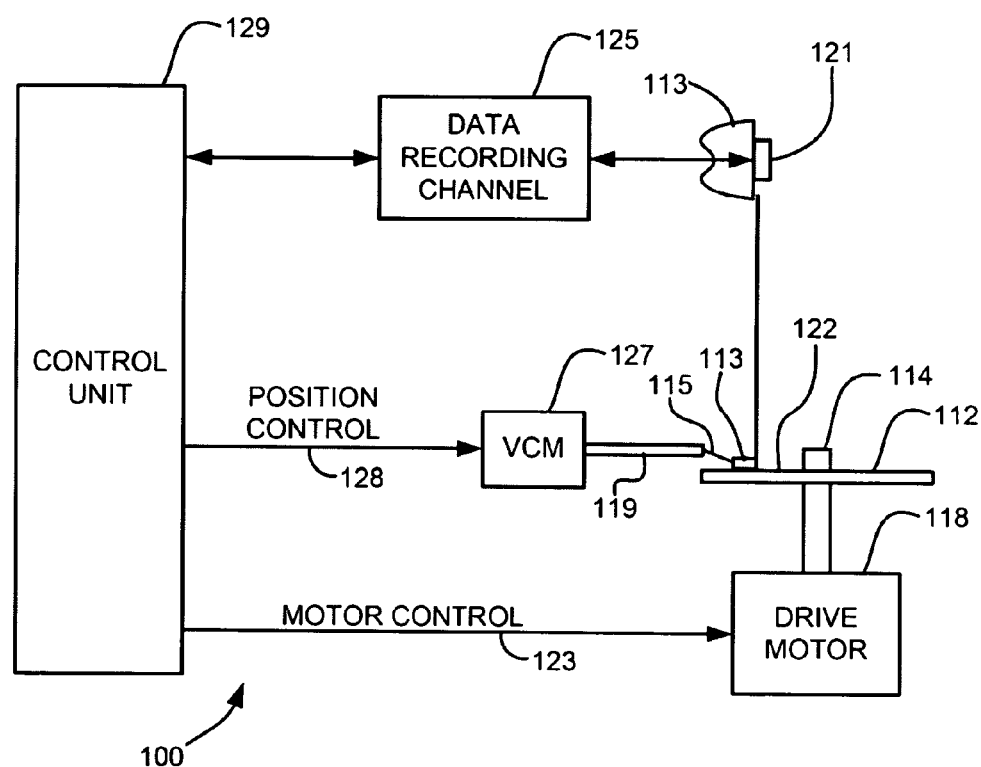
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

Figure 5:
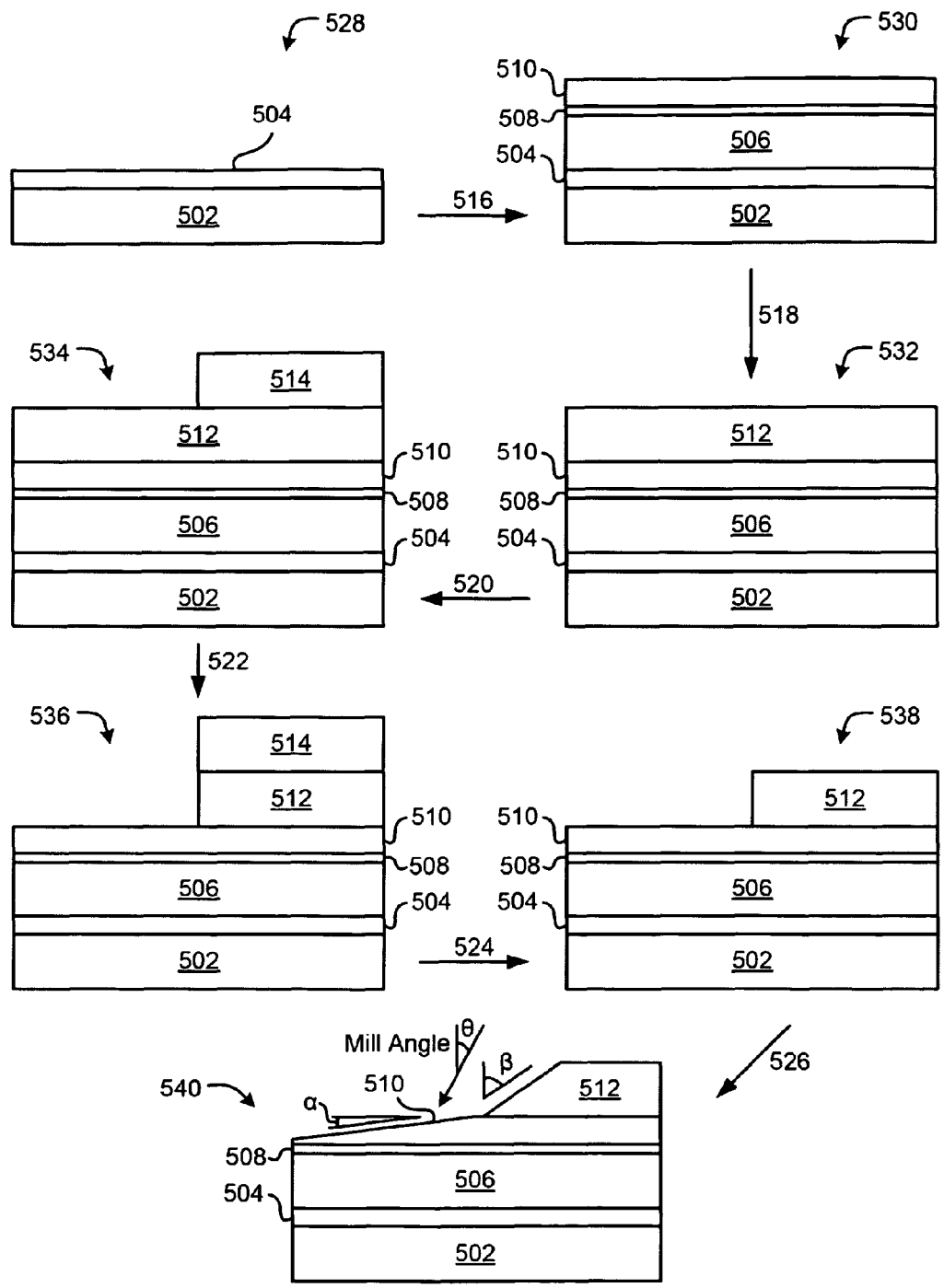
FIG. 5 is a simplified view of processing steps and resulting structures relating to bump processing on a magnetic pole according to several embodiments.

Now referring to FIG. 5, a general method according to some preferred embodiments are shown. The sizes, dimensions, and/or compositions of the layers are for explanatory purposes only, and the layers may be thicker, thinner, wider, narrower, of different composition, etc., than is shown in FIG. 5. Moreover, additional or fewer layers may be used in the various permutations of the general method. The general methodology as described herein may be used in the context of functionality of FIGS. 1-4D, but is not limited to only these embodiments. The general methodology included in FIG. 5 may be carried out in any desired environment.

FIG. 5 includes seven structures according to some embodiments. The explanation begins with the structure 528 in the upper left corner. Structure 528 includes a pole layer 502 which may be a laminate structure, solid structure, composite structure, etc. In addition, the pole layer 502 may be comprised of any type of material that is suitable for use as a magnetic pole in a magnetic head, as would be known to one of reasonable skill in the relevant art. For example, the pole layer 502 may be comprised of CoFe, $CoFe_xN_y$ (where x and y are positive integers such as 1, 2, etc.), NiFe, etc. Insulating layer 504 is generally a hard mask layer which can act as an insulator that can shield the magnetic pole layer 502 from other layers, and as such may be comprised of any nonmagnetic material, preferably but not limited to hard materials, including $Al_2O_3$, AlO, TaO, etc.

In operation 516, structure 528 may have a seed layer deposited thereon. The seed layer may be comprised of multiple layers, each having different compositions, characteristics, and thicknesses.

Now referring to structure 530, the seed layer may be comprised of a gap layer 506, a stop layer 508, and a nonmagnetic layer 510. The gap layer 506 may be comprised of any nonmagnetic material, such as $Al_2O_3$, AlO, Ru, Ta, TaO, NiCr, etc., and generally may serve as a spacer between the pole layer 502 and a shield that may be subsequently layered above the structure. The stop layer 508 is generally used as a milling end point layer in any subsequent milling or etching processes, and as such may be comprised of any suitable material as would be known to one of ordinary skill in the relevant art, including magnetic and nonmagnetic materials, such as $Al_2O_3$, AlO, Ta, Ru, etc. The stop layer 508 may also act as a secondary ion mass spectroscopy (SIMS) layer, such that it can be determined when to stop a subsequent milling process, since the material in the stop layer 508 is uniquely identifiable from any subsequent layers. Nonmagnetic layer 510 may be comprised of any nonmagnetic material, such as $Al_2O_3$, AlO, Ru, Ta, TaO, NiCr, etc.

In some preferred embodiments, the gap layer 506 may include a layer of about 20 nm thick Ru. Also, the stop layer 508 may include a layer of about 2 nm thick Ta, and the nonmagnetic layer 510 may include a layer of about 10 nm thick Ru.

In operation 518, a bump layer 512 may be added above structure 530, resulting in structure 532. The bump layer 512 may be comprised of any nonmagnetic material, such as $Al_2O_3$, AlO, Ru, Ta, TaO, NiCr, etc., that is preferably removable through reactive ion etching (RIE), and generally acts as the material from which the bump is later formed. The bump layer 512 may be formed of one or more layers.

In operation 520, a resist layer 514 may be formed above a portion of structure 532, resulting in structure 534. The resist layer 514 may be comprised of any material suitable for use as a resist layer as would be known to one of reasonable skill in the relevant art, such as a photoresist and/or mask material, etc.

In operation 522, RIE or any other technique known in the art for removing material, such as milling, etc., may be used to remove the portion of the bump layer 512 which is not directly beneath the resist layer 514, possibly resulting in structure 536.

In operation 524, the resist layer 514 may be removed through any technique known in the relevant art, such as stripping the layer, resulting in structure 538. Structure 538 shows the bump layer 512 only above a portion of the structure, and the total portion of the structure which the bump layer 512 covers may vary, depending on the desired effect that the bump layer 512 may have once completed.

In operation 526, at least the bump layer 512 and the nonmagnetic layer 510 may be angled, through a technique known to one of skill in the relevant art, such as milling, shadow milling, etching, etc. Preferably, the layers may be milled at an angle θ of between about 30° to about 60° from normal to the plane of the layers. Preferably, the result of operation 526 may be structure 540.

Structure 540 includes a bump layer 512 and a nonmagnetic layer 510 which may both be angled, forming a first and second surface. Preferably, there may be a step between two angles of a bump structure. Each layer may be processed at a different angle or the same angle, for example, the nonmagnetic layer 510 may be at an angle α of between about 1° to about 89° from the main pole plane. Preferably, the nonmagnetic layer 510 may be at an angle α of between about 5° to about 10° from the main pole plane.

Bump layer 512 may be at angle β of between about 1° and about 89° from normal to the plane of the layer. Bump layer 512 may preferably be at an angle β of about 45° from normal to the plane of the layer.

In some preferred embodiments, these angles may be achieved through a single shadow milling process, where the angle of the milling results in the bump layer 512 shielding a portion of the nonmagnetic layer 510 from the full extent of the milling process.

Figure 6:
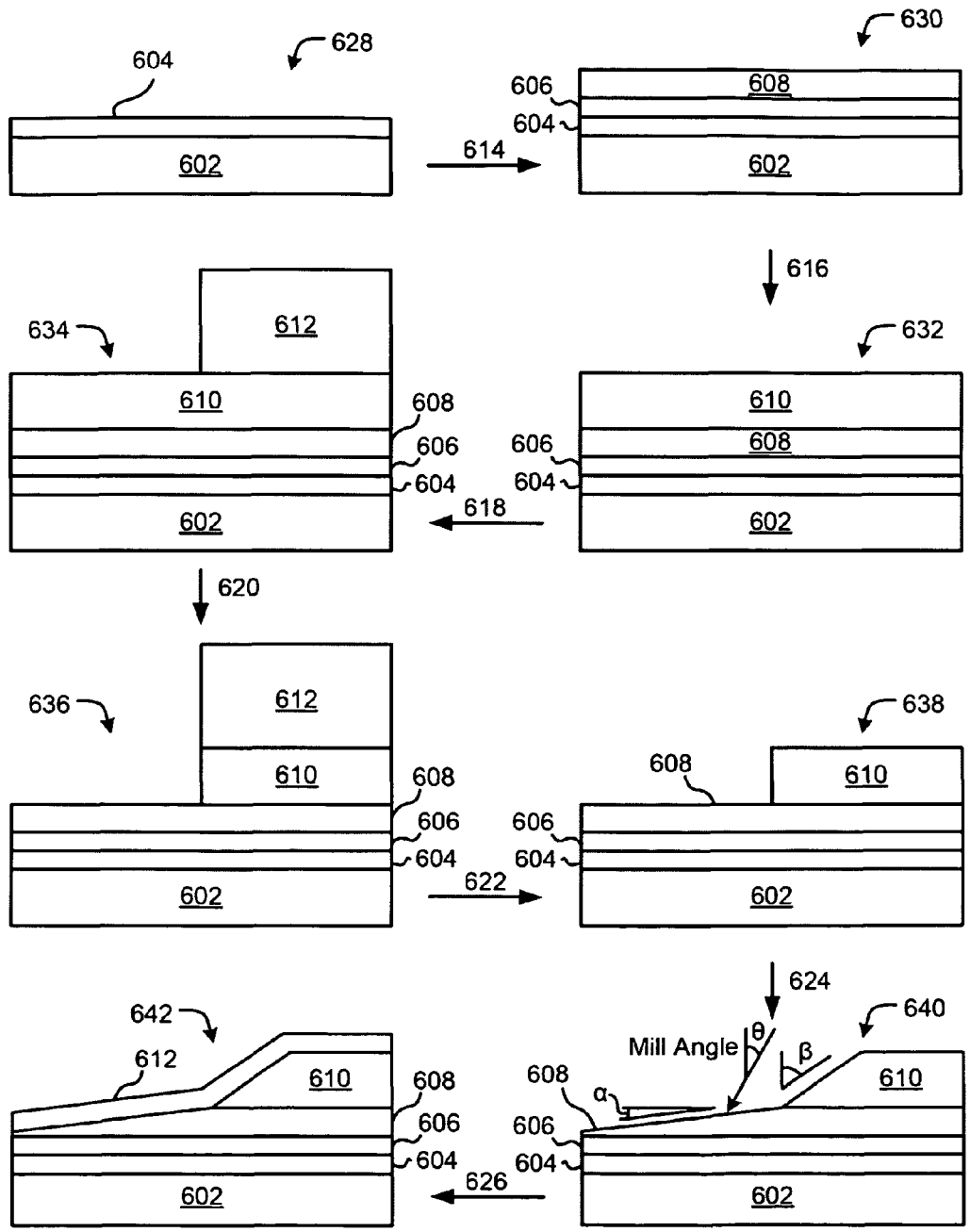
FIG. 6 is a simplified view of processing steps and resulting structures relating to bump processing on a magnetic pole according to several embodiments.

A seed layer (not shown) may be added above structure 540. Another shield photo layer may be applied over the seed layer, followed by electrical plating of magnetic shield material such as NiFe. Now referring to FIG. 6, a general method according to some preferred embodiments are shown. The sizes, dimensions, and/or compositions of the layers are for explanatory purposes only, and the layers may be thicker, thinner, wider, narrower, of different composition, etc., than is shown in FIG. 6. Moreover, additional or fewer layers may be used in the various permutations of the general method. The general methodology as described herein may be used in the context of functionality of FIGS. 1-4D, but is not limited to only these embodiments. The general methodology included in FIG. 6 may be carried out in any desired environment.

FIG. 6 includes eight structures according to some embodiments. The explanation begins with the structure 628 in the upper left corner. Structure 628 includes a pole layer 602 which may be a laminate structure, solid structure, composite structure, etc. In addition, the pole layer 602 may be comprised of any type of material that is suitable for use as a magnetic pole in a magnetic head, as would be known to one of reasonable skill in the relevant art. For example, the pole layer 602 may be comprised of CoFe, $CoFe_xN_y$ (where x and y are positive integers such as 1, 2, etc.), NiFe, etc. Insulating layer 604 is generally a hard mask layer which can act as an insulator that can shield the magnetic pole layer 602 from other layers, and as such may be comprised of any nonmagnetic material, preferably but not limited to hard materials, including $Al_2O_3$, AlO, TaO, etc.

In operation 614, structure 628 may have a seed layer deposited thereon. The seed layer may be comprised of multiple layers, each having different compositions, characteristics, and thicknesses. Preferably, the seed layer may be comprised of about 10 nm thick Ru in nonmagnetic layer 608 and about 2 nm thick Ta in stop layer 606.

Now referring to structure 630, the seed layer may be comprised of a stop layer 606 and a nonmagnetic layer 608. The stop layer 606 may be used as a milling end point layer in any subsequent milling or etching processes, and as such may be comprised of any suitable material as would be known to one of ordinary skill in the relevant art, including magnetic and nonmagnetic materials, such as $Al_2O_3$, AlO, Ta, Ru, etc. The stop layer 606 may also act as a secondary ion mass spectroscopy (SIMS) layer, such that it can be determined when to stop a subsequent milling process, since the material in the stop layer 606 is uniquely identifiable from any subsequent layers. Nonmagnetic layer 608 may be comprised of any nonmagnetic material, such as $Al_2O_3$, AlO, Ru, Ta, TaO, NiCr, etc., and may generally form a portion of a bump in later processing.

In operation 616, a bump layer 610 may be added above structure 630, resulting in structure 632. The bump layer 610 may be comprised of any nonmagnetic material, such as $Al_2O_3$, AlO, Ru, Ta, TaO, NiCr, etc., that is preferably removable through reactive ion etching (RIE) or combination of ion milling, and generally acts as the material from which a portion of a bump is later formed.

In operation 618, a resist layer 612 may be formed above a portion of structure 632, resulting in structure 634. The resist layer 612 may be comprised of any material suitable for use as a resist layer as would be known to one of reasonable skill in the relevant art, such as a photoresist and/or mask material, etc.

In operation 620, RIE or any other technique known in the art for removing material, such as milling, etc., may be used to remove the portion of the bump layer 610 which is not directly beneath the resist layer 612, possibly resulting in structure 636.

In operation 622, the resist layer 612 may be removed through any technique known in the relevant art, such as stripping the layer, resulting in structure 638. Structure 638 shows the bump layer 610 only above a portion of the structure, and the total portion of the structure which the bump layer 610 covers may vary, depending on the desired effect that the bump layer 610 may have once completed.

In operation 624, at least the bump layer 610 and the nonmagnetic layer 608 may be angled, through a technique known to one of skill in the relevant art, such as milling, shadow milling, etching, etc. Preferably, the layers may be milled at an angle θ of between about 30° to about 60° from normal to the plane of the layers. Preferably, the result of operation 624 may be structure 640.

Structure 640 may include a bump layer 610 and a nonmagnetic layer 608 which may both be angled, forming a first and second surface. In some embodiments, the first surface may be formed on the bump layer 610, and the second surface may be formed on the nonmagnetic layer 608. In other embodiments, the first surface may be formed on the nonmagnetic layer 608, and the second surface may be formed on the bump layer 610.

Each layer may be processed at a different angle or the same angle, for example, the nonmagnetic layer 608 may be at an angle a of between about 1° to about 89° from the main pole plane. Preferably, the nonmagnetic layer 608 may be at an angle α of between about 5° to about 10° from the plane of the main pole layer.

Bump layer 610 may be at angle β of between about 1° and about 89° from normal to the plane of the layer. Bump layer 610 may preferably be at angle β of about 45° from normal to the plane of the layer. Preferably, these angles may be achieved through a single shadow milling process, where the angle of the milling results in the bump layer 610 shielding a portion of the nonmagnetic layer 608 from the full extent of the milling process.

In operation 626, a top gap layer 612 may be formed above the structure 640, possibly resulting in structure 642. The top gap layer 612 may act as a gap layer and generally may serve as a spacer between the pole layer 602 and a shield that may be subsequently layered above the structure 640. The top gap layer 612 may be comprised of any nonmagnetic material, such as $Al_2O_3$, AlO, Ru, Ta, TaO, NiCr, etc.

In some preferred embodiments, the top gap layer 612 may conform to about the shape of the nonmagnetic layer 608 and the bump layer 610. This result may be achieved using any deposition process. In particularly preferred embodiments, for example where chemical vapor deposition (CVD) is used, the resulting top gap layer 612 may be very conformal to the underlying topography and may have a substantially uniform thickness. Accordingly, the first and second surfaces of the bump layer, possibly formed by the nonmagnetic layer 608 and the bump layer 610, may translate to the upper surface of the top gap layer 612.

In some embodiments, a seed layer (not shown) may be added above structure 642. The seed layer may be comprised of a layer of about 5 nm thick CoFe or the like, and another shield photo layer can be applied, followed with electrical plating of a magnetic shield material such as NiFe. With continued reference to structure 642, in some embodiments, a system may be comprised of a magnetic pole 602, a bump structure (possibly including layers 608 and 610) above the pole 602. The bump structure may have a first surface oriented at a first angle a between about 1° and about 89° from a plane of deposition of the pole 602, and a second surface oriented at a second angle β between about 1° and about 89° from the plane of deposition of the pole 602, wherein the second angle β may be greater than the first angle α. Note that the surfaces may not be flat, and so the respective angle can be measured relative to a mean surface thereof, relative to a plane defined between endpoints of the particular surface, etc. Also, the system may include a shield above the bump structure.

In some embodiments, the first angle a may be between about 1° and about 20° from the plane of deposition of the pole 602, alternatively between about 5° and about 10° from the plane of deposition of the pole 602.

In some embodiments, the second angle β may be between about 20° and about 89° from the plane of deposition of the pole 602, alternatively greater than about 45° from the plane of deposition of the pole 602.

Figure 7:
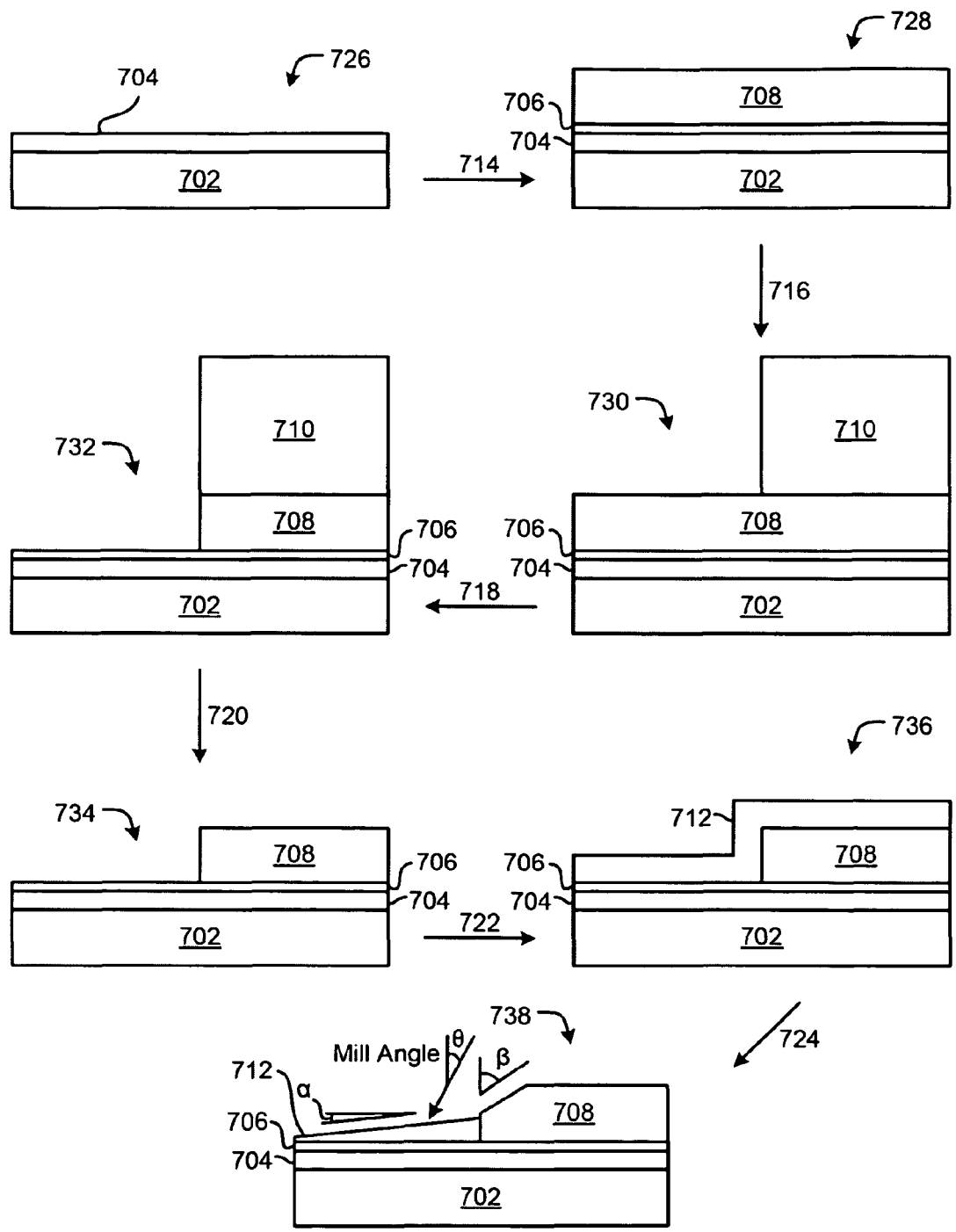
FIG. 7 is a simplified view of processing steps and resulting structures relating to bump processing on a magnetic pole according to several embodiments.

Now referring to FIG. 7, a general method according to some preferred embodiments are shown. The sizes, dimensions, and/or compositions of the layers are for explanatory purposes only, and the layers may be thicker, thinner, wider, narrower, of different composition, etc., than is shown in FIG. 7. Moreover, additional or fewer layers may be used in the various permutations of the general method. The general methodology as described herein may be used in the context of functionality of FIGS. 1-4D, but is not limited to only these embodiments. The general methodology included in FIG. 7 may be carried out in any desired environment.

FIG. 7 includes seven structures according to some embodiments. The explanation begins with the structure 726 in the upper left corner. Structure 726 includes a pole layer 702 which may be a laminate structure, solid structure, composite structure, etc. In addition, the pole layer 702 may be comprised of any type of material that is suitable for use as a magnetic pole in a magnetic head, as would be known to one of reasonable skill in the relevant art. For example, the pole layer 702 may be comprised of CoFe, $CoFe_xN_y$ (where x and y are positive integers such as 1, 2, etc.), NiFe, etc. Insulating layer 704 is generally a hard mask layer which can act as an insulator that can shield the magnetic pole layer 702 from other layers, and as such may be comprised of any nonmagnetic material, preferably but not limited to hard materials, including $Al_2O_3$, AlO, TaO, etc.

In operation 714, structure 726 may have one or more layers deposited thereon. These layers may include a stop layer 706 and a bump layer 708. Each of these layers may be comprised of multiple layers, each having different compositions, characteristics, and thicknesses.

Now referring to structure 728, a stop layer 706, and a bump layer 708 may be formed above the insulating layer 704. The stop layer 706 is generally used as an end point layer in any subsequent milling or etching processes, and as such may be comprised of any suitable material as would be known to one of ordinary skill in the relevant art, including magnetic and nonmagnetic materials, such as $Al_2O_3$, AlO, Ta, Ru, etc. The stop layer 706 may also act as a secondary ion mass spectroscopy (SIMS) layer, such that it can be determined when to stop a subsequent milling process or reactive ion etching process, since the material in the stop layer 706 is uniquely identifiable from any subsequent layers.

The bump layer 708 may be comprised of any nonmagnetic material, such as $Al_2O_3$, AlO, Ru, Ta, TaO, NiCr, etc., that is preferably removable through reactive ion etching (RIE), and generally acts as the material from which the bump is later formed. In some preferred embodiments, the bump layer 708 may include a layer of about 20 to about 100 nm thick Ta.

In operation 716, a resist layer 710 may be formed above a portion of structure 728, resulting in structure 730. The resist layer 710 may be comprised of any material suitable for use as a resist layer as would be known to one of reasonable skill in the relevant art, such as a photoresist and/or mask material, etc.

In operation 718, RIE or any other technique known in the art for removing material, such as milling, etc., may be used to remove the portion of the bump layer 708 which is not directly beneath the resist layer 710, possibly resulting in structure 732.

In operation 720, the resist layer 710 may be removed through any technique known in the relevant art, such as stripping the layer, resulting in structure 734. Structure 734 shows the bump layer 708 only above a portion of the structure, and the total portion of the structure which the bump layer 708 covers may vary, depending on the desired effect that the bump layer 708 may have once completed.

In operation 722, a nonmagnetic layer 712 may be formed above structure 734, possibly resulting in structure 736. The nonmagnetic layer 712 may be formed as a full-film layer, possibly through atomic layer deposition (ALD) or any other technique known to one of ordinary skill in the relevant art, allowing the layer to be formed above the entire structure, causing a substantially uniform layer above all surfaces. The nonmagnetic layer 712 may be comprised of any nonmagnetic material, such as $Al_2O_3$, AlO, Ru, Ta, TaO, NiCr, etc., that is preferably removable through ion milling and generally acts as the material from which a portion of a bump is later formed.

In operation 724, at least the bump layer 708 and the nonmagnetic layer 712 may be angled, through a technique known to one of skill in the relevant art, such as milling, shadow milling, etching, etc. Preferably, the layers may be milled at an angle θ of between about 30° to about 60° from normal to the plane of the layers. Preferably, the result of operation 724 may be structure 738.

Structure 738 includes a bump layer 708 and a nonmagnetic layer 712 which may both be angled. Each layer may be processed at a different angle or the same angle. Preferably, the nonmagnetic layer 712 may be at an angle a of between about 5° to about 10° from pole 702 plane. Bump layer 708 may preferably be at angle β of about 45° from pole 702 plane. Preferably, these angles may be achieved through a single shadow milling process, where the angle of the milling results in the bump layer 708 shielding a portion of the nonmagnetic layer 712 from the full extent of the milling process.

A seed layer (not shown) may be added above structure 738. and another shield photo layer can be applied, followed with electrical plating of magnetic shield material like NiFe.

In any embodiment, a wrap around shield may be formed in conjunction with the inventive structures. Illustrative wrap around shield fabrication and designs are described in U.S. patent application Ser. No. 12/120,129 to Zheng, filed May 13, 2008 and which is incorporated by reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a magnetic pole;
a bump structure above the pole, the bump structure having a first surface oriented at a first angle between about 1° and about 20° from the plane of deposition of the pole, and a second surface oriented at a second angle between 1° and 89° from the plane of deposition of the pole, wherein the second angle is greater than the first angle; and
a shield above the bump structure.

2. A system as recited in claim 1, wherein the first angle is between about 5° and about 10° from the plane of deposition of the pole.

3. A system comprising:
a magnetic pole;
a bump structure above the pole, the bump structure having a first surface oriented at a first angle between 1° and 89° from a plane of deposition of the pole, and a second surface oriented at a second angle between about 20° and about 89° from the plane of deposition of the pole, wherein the second angle is greater than the first angle; and
a shield above the bump structure.

4. A system as recited in claim 3, wherein the second angle is greater than about 45° from the plane of deposition of the pole.

5. A system comprising:
a magnetic pole;
a bump structure above the pole, the bump structure having a first surface oriented at a first angle between 1° and 89° from a plane of deposition of the pole, and a second surface oriented at a second angle between 1° and 89° from the plane of deposition of the pole, wherein the second angle is greater than the first angle; and
a shield above the bump structure, wherein the shield is a wrap around shield.

6. A system as recited in claim 5, wherein the pole is a laminate structure.

7. A method comprising:
forming a bump layer above a magnetic pole;
removing a portion of the bump layer for forming a step therein: and
milling the bump layer for defining thereon a first surface oriented at a first angle between 1° and 89° from a plane of deposition of the bump layer, and a second surface oriented at a second angle between and 89° from the plane of deposition of the bump layer, wherein the second angle is greater than the first angle,
wherein the angle of the first surface is at least partially a result of shadowing of the milling by the step.

8. A method comprising:
forming a bump layer above a magnetic pole;
removing a portion of the bump layer for forming a step therein; and
milling the bump layer for defining thereon a first surface oriented at a first angle between 1° and 89° from a plane of deposition of the bump layer, and a second surface oriented at a second angle between 1° and 89° from the plane of deposition of the bump layer, wherein the second angle is greater than the first angle, wherein the milling is performed at an angle of between about 30° and about 60° from normal to the plane of deposition of the bump layer.

9. A method, comprising:
forming a bump layer above a magnetic pole;
removing a portion of the bump layer for forming a step therein;
milling the bump layer for defining thereon a first surface oriented at a first angle between 1° and 89° from a plane of deposition of the bump layer, and a second surface oriented at a second angle between 1° and 89° from the plane of deposition of the bump layer, wherein the second angle is greater than the first angle; and
forming a magnetic shield above the bump layer.

10. A method as recited in claim 9, further comprising forming a layer of nonmagnetic material above the magnetic pole, the bump layer being formed above the layer of nonmagnetic material.

11. A method as recited in claim 9, wherein the bump layer is comprised of multiple layers.

12. A method as recited in claim 9, wherein
removing the portion of the bump layer for forming the step therein comprises
masking the bump layer and etching an exposed portion of the bump layer.

13. A method as recited in claim 9, further comprising forming a top gap layer above the bump layer.

14. A method as recited in claim 13, wherein an upper surface of the top gap layer about conforms to a shape of the first and second surfaces of the bump layer.

15. A method as recited in claim 9, wherein the shield is a wrap around shield.

16. A method as recited in claim 9, wherein the first angle is between about 1° and about 20° from the plane of deposition of the pole.

17. A method as recited in claim 9, wherein the second angle is between about 20° and about 89° from the plane of deposition of the pole.

18. A method as recited in claim 9, wherein the pole is a laminate structure.

* * * * *

UNITED STATES PATENT AND TRADEMARK OFFICE
CERTIFICATE OF CORRECTION

| | | |
|---|---|---|
| PATENT NO. | : 8,085,497 B2 | Page 1 of 1 |
| APPLICATION NO. | : 12/341834 | |
| DATED | : December 27, 2011 | |
| INVENTOR(S) | : Wen-Chien David Hsiao et al. | |

It is certified that error appears in the above-identified patent and that said Letters Patent is hereby corrected as shown below:

In column 11, line 49, a --,-- should be inserted between "system" and "comprising".
In column 11, line 61, a --,-- should be inserted between "system" and "comprising".
In column 12, line 6, a --,-- should be inserted between "method" and "comprising".
In column 12, line 9, a ":" should be replaced with --;--.
In column 12, line 13, a --1°-- should be inserted between "between" and "and".
In column 12, line 18, a --,-- should be inserted between "method" and "comprising".

Signed and Sealed this
Twenty-fourth Day of April, 2012

David J. Kappos
*Director of the United States Patent and Trademark Office*